US010213875B2

(12) United States Patent
Bode et al.

(10) Patent No.: US 10,213,875 B2
(45) Date of Patent: Feb. 26, 2019

(54) METHOD FOR MANUFACTURING A HOUSING OF A TURBOMACHINE

(71) Applicant: Siemens Aktiengesellschaft, Munich (DE)

(72) Inventors: Ralf Bode, Moers (DE); Dieter Naß, Moers (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/762,694

(22) PCT Filed: Sep. 1, 2016

(86) PCT No.: PCT/EP2016/070575
§ 371 (c)(1),
(2) Date: Mar. 23, 2018

(87) PCT Pub. No.: WO2017/055006
PCT Pub. Date: Apr. 6, 2017

(65) Prior Publication Data
US 2018/0272470 A1    Sep. 27, 2018

(30) Foreign Application Priority Data

Sep. 30, 2015 (EP) .................... 15187542

(51) Int. Cl.
*B23P 15/00* (2006.01)
*F01D 25/00* (2006.01)
(Continued)

(52) U.S. Cl.
CPC .......... *B23K 26/342* (2015.10); *F01D 25/007* (2013.01); *F01D 25/243* (2013.01);
(Continued)

(58) Field of Classification Search
CPC ................ B23P 2700/13; B23P 15/008; F05D 2230/60; F05D 2230/50; F05D 2230/53;
(Continued)

(56) References Cited

U.S. PATENT DOCUMENTS

2004/0222571 A1\* 11/2004 Steffier .................. B23P 15/008
                                                              264/602
2011/0232290 A1    9/2011 Mohr et al.
(Continued)

FOREIGN PATENT DOCUMENTS

DE    102006022683 A1    11/2007
EP         2623730 A1     8/2013
WO      2014082802 A2     6/2014

OTHER PUBLICATIONS

EP Search Report dated Apr. 18, 2016, for EP patent application No. 15187542.4.
(Continued)

*Primary Examiner* — Christopher J Besler
(74) *Attorney, Agent, or Firm* — Beusse Wolter Sanks & Maire

(57) ABSTRACT

A method for manufacturing a housing of a turbomachine, in particular a housing of a radial turbo compressor. The method includes the following steps: a) providing a hollow body that is closed in a circumferential direction and extends along an axis; b) coating the inner side of the hollow body with a corrosion-resistant layer that is more resistant to corrosion than the material of the hollow body; c) dividing the hollow body into two half-shells along the axis in a separation joint plane; d) assembling the housing by joining both half-shells and fastening both half-shells in the region of the separation joints, which were created by separation, by means of detachable fastening elements.

12 Claims, 5 Drawing Sheets

(51) Int. Cl.
*F01D 25/24* (2006.01)
*B23K 26/342* (2014.01)

(52) U.S. Cl.
CPC ........ *B23P 15/008* (2013.01); *F05D 2220/40* (2013.01); *F05D 2230/50* (2013.01); *F05D 2230/90* (2013.01); *F05D 2260/95* (2013.01)

(58) Field of Classification Search
CPC . F05D 2230/90; F05D 2220/40; F01D 25/243
See application file for complete search history.

(56) References Cited

U.S. PATENT DOCUMENTS

| 2014/0033735 A1* | 2/2014 | Soundiramourty | F01D 9/041 |
| | | | 60/799 |
| 2015/0030459 A1 | 1/2015 | Schuerhoff | |

OTHER PUBLICATIONS

International Search Report dated Oct. 6, 2016, for PCT/EP2016/070575.

\* cited by examiner

METHOD FOR MANUFACTURING A HOUSING OF A TURBOMACHINE

CROSS REFERENCE TO RELATED APPLICATIONS

This application is the US National Stage of International Application No. PCT/EP2016/070575 filed Sep. 1, 2016, and claims the benefit thereof. The International Application claims the benefit of European Application No. EP15187542 filed Sep. 30, 2015. All of the applications are incorporated by reference herein in their entirety.

FIELD OF INVENTION

The invention concerns a method for manufacturing a housing of a turbomachine, in particular a housing of a radial turbo compressor.

BACKGROUND OF INVENTION

Radial turbo compressors of the design in which a shaft with one or more compressor impellers is arranged between two bearings ("single shaft compressor") generally comprise a housing which is characterized either by a horizontal or by a vertical separation. If these turbo compressors are exposed to corrosive media, the housings as a whole may consist of a corrosion-resistant material or be lined or coated with a corrosion-resistant material in regions in contact with the media. In plant construction in the chemical industry and for the oil and gas sector, it is very common to produce a corrosion-resistant layer by deposition welding with a corrosion-resistant alloy. Depending on the corrosivity of the media concerned, stainless steels with corresponding composition or also nickel-based alloys may be used. Whereas this procedure is applied with a high degree of automation for compressor housings with a vertical separating joint, when applied to housings with horizontal separating joints, difficulties arise because of their more complex geometry and the tendency towards severe distortions because of the weld stresses.

Compressors with horizontal separating joints are made either integrally of a corrosion-resistant alloy, or protected at great expense with a combination of cladding with corrosion-resistant panels and deposition welding. Here, a suitable weld sequence is necessary, in combination with controlled heat application during welding, with the aim of minimizing the stresses and hence distortions.

The procedure as described above is disclosed at least partially in US 2011/0232290A1 for a housing with vertical separating joint (casing-cover design).

SUMMARY OF INVENTION

The disadvantages and difficulties outlined may be avoided by means of the method according to the invention.

Terms which relate to an axis, e.g. axial, tangential, radial or peripheral, always refer to an axis or longitudinal axis of the hollow body according to the independent claim unless specified otherwise. The hollow body is characterized by a cavity extending along this axis, wherein the cavity is defined by this axis insofar as the radial turbo compressor has a rotor which has the same or at least parallel axial extension or rotation axis. Accordingly, usually but not necessarily, this axis of the hollow body is also the longest spatial extension of the hollow body or later housing after completion of all production steps. In compressors with fewer stages and/or a greater impeller diameter, the axial extension of the hollow body and the later housing may also be smaller than the radial extension. Further steps may be provided between the individual steps of the method according to the invention, wherein this method with the additional steps—which are not necessarily all disclosed in this publication—nonetheless complies with the invention. The decisive factor is that all steps according to the invention take place in the production method.

A particularly advantageous refinement of the invention provides that the hollow body is configured as a hollow cylinder with regard to the interior space, so that the cavity is cylindrical along the above-mentioned axis. Particularly suitably, in particular for automated coating, the hollow body is configured so as to be rotationally symmetrical, so that the coating process can be fully automated particularly simply. A variant of the coating is deposition welding.

If the coating is applied by means of deposition welding or another process which entails a relatively high heat application to the base material of the hollow body, it is suitable if the hollow body is subjected to stress-relief annealing after coating and before separation of the hollow body into two half-shells. A particular advantage of the invention is that the hollow body, which remains closed in the peripheral direction during coating, in particular during deposition welding, scarcely deforms or deforms only relatively slightly because of the structure which is closed in the peripheral direction. If stress-relief annealing is carried out after coating, separation into the two half-shells can take place without additional deformation because of the pre-existing thermal stresses.

Advantageously, the hollow body may be separated into two half-shells by means of a saw cut, by means of erosion, by means of burning, by means of waterjet cutting, by means of laser beam cutting or by means of electron beam cutting. The volume lost because of separation in the region of the resulting separating joint plane varies depending on the separating method selected. In order to compensate for the loss of volume from separation, advantageously the coating or deposition welding in the interior of the hollow body before separation may take place with a corresponding surplus, and subsequent mechanical machining can, by using the surplus, recreate the advantageously round diameter of the two half-shells mounted on each other. Alternatively, the volume lost in the separating joint region due to the separation at the separating joint may be added back to the half-shell at least on one side or on at least one half-shell in the region of the separating joint by means of an additive production process, so that finally again an advantageously round contour results at the diameter of the interior.

An advantageous additive production process here is deposition welding. To ensure that the housing is corrosion-resistant even in the region of the separating joint, the deposition welding or the additive production process may take place in the region of the separating joint using a corrosion-resistant coating or deposition welding material, in order to compensate for volume loss from separation. In the region of the separating joint, this corrosion-resistant coating material need not be applied over the entire radial extension of the separating joint. A part of the separating joint, which cannot be reached by the corrosive process medium in the desired usage of the housing during operation, may also be coated with non-corrosion-resistant material. If the coating in the separating joint region takes place by means of deposition welding, it is suitable if mechanical machining takes place after deposition welding in order to produce the finished dimensions. For production of a sufficiently precise diameter with a substantially round cross-section form of the housing interior, it is suitable if this interior is subjected to further mechanical machining after coating or after deposition welding with a corrosion-resistant coating material.

An advantageous refinement of the invention proposes that at least one of the two half-shells, depending on requirements, is provided with radial openings in the walls of the half-shells for connection of pipelines.

The invention is illustrated below with reference to exemplary embodiments for the purpose of explanation with reference to drawings.

DETAILED DESCRIPTION OF INVENTION

Figure 6:
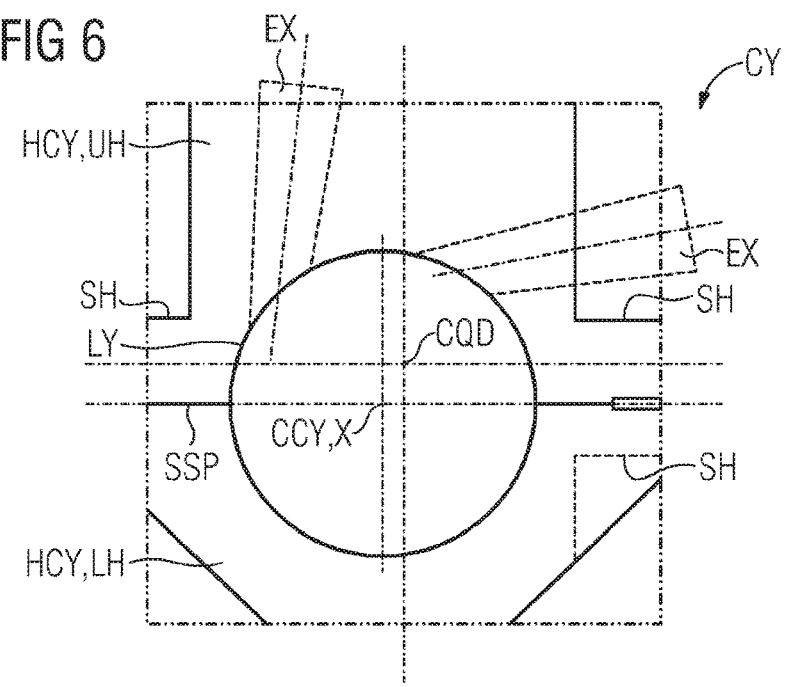
FIG. 6 a diagrammatic depiction of the cross-section of FIG. 5 after preparation of the housing for the purpose of bolting the two half-shells together.
Figure 7:
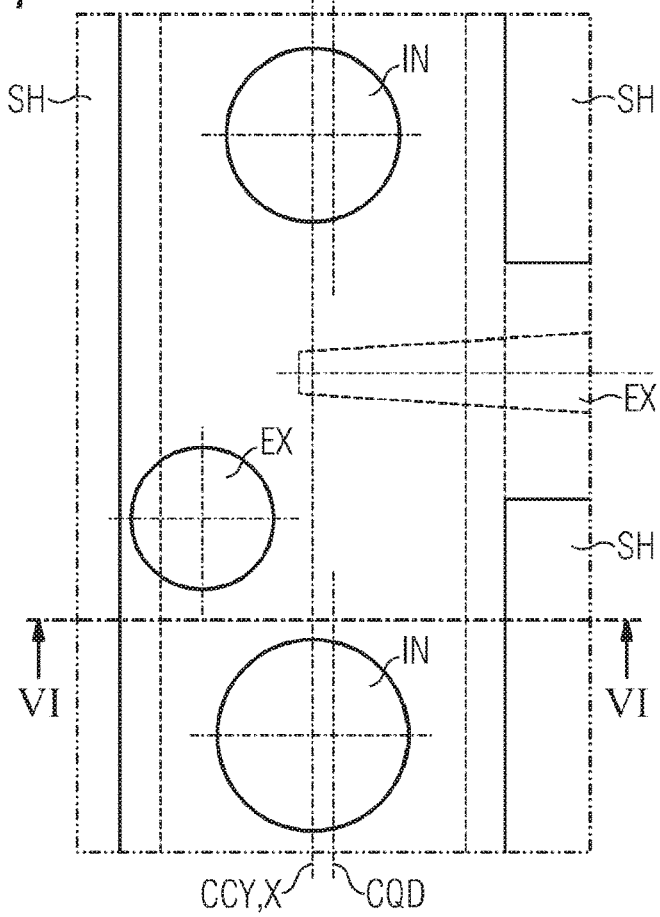
FIG. 7 a diagrammatic depiction of the configuration of FIG. 6 in a top view from radially above.

The depictions of the figures are all diagrammatic and greatly simplified. FIGS. 1 to 6 each show an axial view of a cross-section of a hollow body CY or two half-shells HCY along an axis X. FIG. 7 shows a radial top view in diagrammatic form onto a housing C as shown in cross-section in FIG. 6. The position of the cross-section of FIG. 6 is indicated in FIG. 7 as VI.

Figure 1:
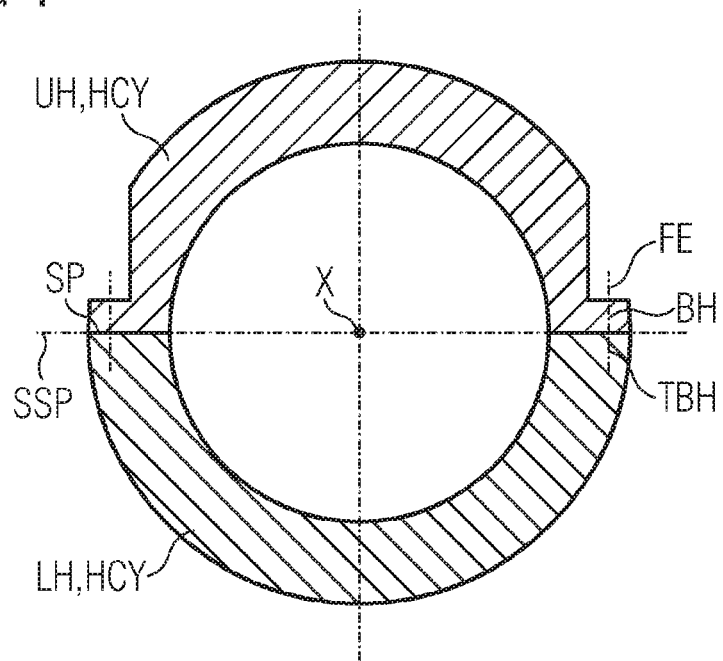
FIG. 1 a diagrammatic cross-section through a prepared hollow body of a housing according to the invention without corrosion protection.

The hollow body CY shown in cross-section in FIG. 1 is already prepared for the application of fixing elements FE by means of milling in the upper part UH. The fixing elements FE are advantageously formed as bolts. The position of the fixing elements FE for later assembly is indicated diagrammatically by dotted lines. After a subsequent step of coating the base material of the hollow body with a more corrosion-resistant material, the hollow body CY is separated into an upper half UH or half-shell CY and a lower half LH or half-shell HCY in a separating joint plane SSP, giving a separating joint SP. The fixing elements FE then, as indicated diagrammatically by means of the dotted lines, extend through the upper half UH along a bored hole BH and are screwed into a threaded bore TBH of the lower half LH, so that the support shoulders SH formed on the upper half UH are suitable as counter-bearings for clamping against the lower half LH by means of the fixing elements FE in threaded bores TBH.

Figure 2:
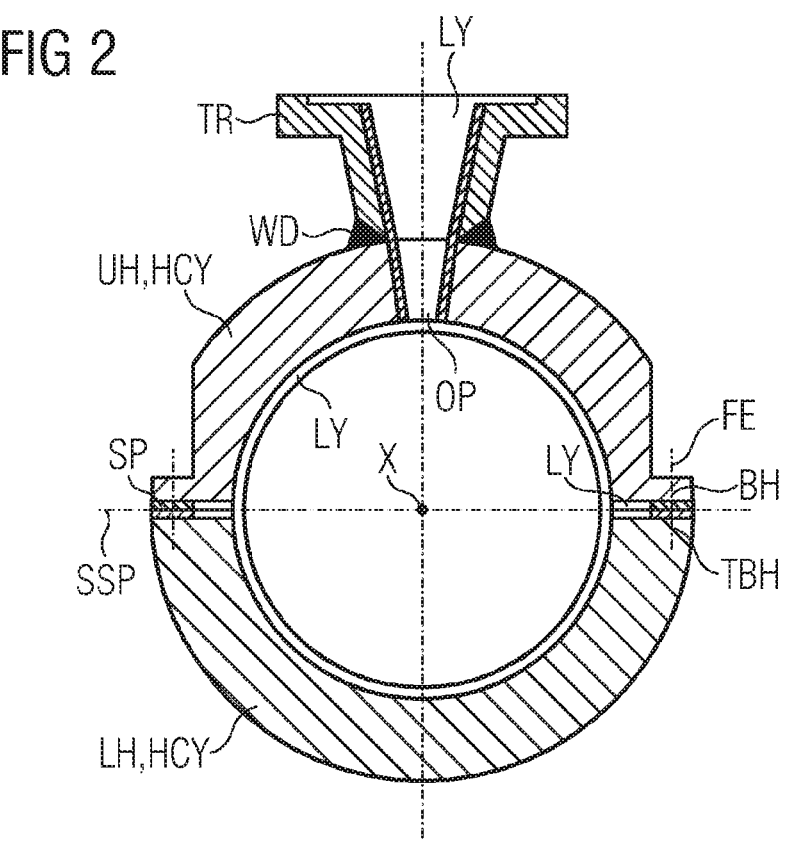
FIG. 2 the hollow body of the housing according to the invention as shown in FIG. 1 after a separating cut in the separating joint plane, with a connecting piece of non-corrosion-resistant material with a corrosion-resistant layer LY.

FIG. 2 shows a variant of the housing C according to FIG. 1 after further process steps. The separation, indicated by means of the hatching in FIG. 1 which is different for each of the two half-shells HCY, is already completed in FIG. 2, after a coating of the more corrosion-resistant material has been applied as a layer LY on the inside of the hollow body CY. In this concrete exemplary embodiment, said application took place using deposition welding before separation, wherein after deposition welding, stress-relief annealing was carried out so that the hollow body CY could be separated into two half-shells HCY largely without distortion. Following the separation of the hollow body CY, a radial opening OP was made in the upper half UH and a connecting piece TR welded on in the region of the opening OP by means of a weld seam WD. On the inside of the surface provided for flow guidance, the connecting piece TR is also coated with the more corrosion-resistant material in the form of a layer LY, wherein the connecting piece TR has a flange face which is at least partially also provided with a layer LY, so that a corrosive process medium present in the flange plane during operation of the radial turbo compressor cannot damage these flange surfaces.

Figure 3:
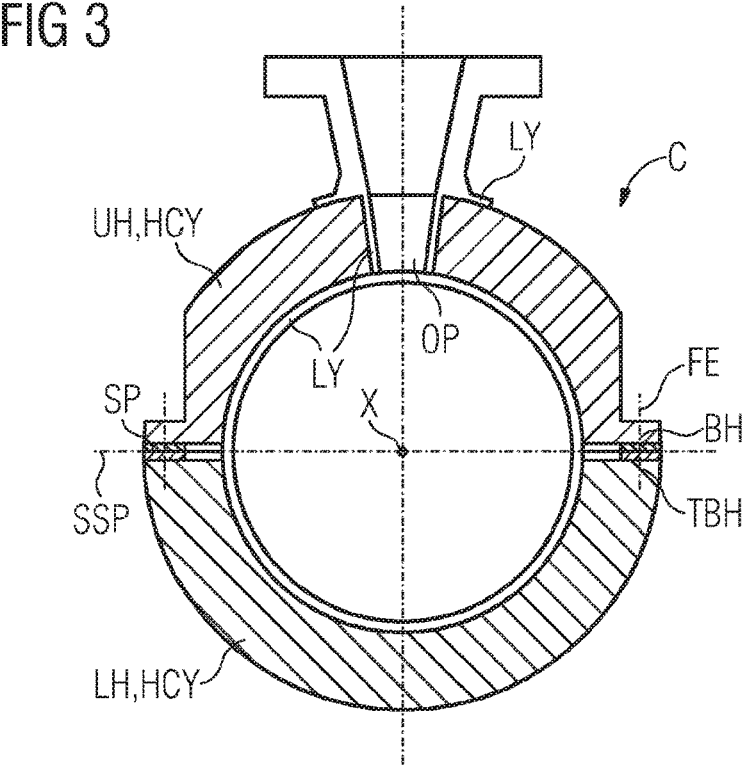
FIG. 3 the depiction in FIG. 2 only with a connecting piece of corrosion-resistant material.

As an alternative, the entire connecting piece TR shown in FIG. 3 is made of the more corrosion-resistant material and attached to the upper half UH of the hollow body CY in the region of the opening OP by means of a weld seam WD.

Figure 4:
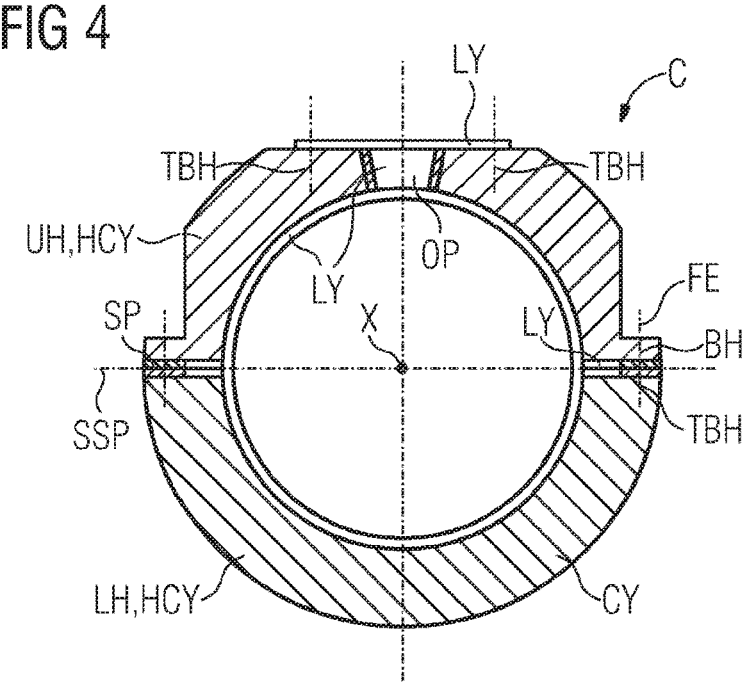
FIG. 4 the diagrammatic depiction of two half-shells attached to each other, wherein the upper half-shell is prepared for a connecting piece.

FIG. 4 shows a further alternative for the connecting piece TR. The connecting piece TR is here bolted in the manner of a flange directly to the upper half UH by means of fixing elements FE which are indicated by dotted lines. In preparation for this connection to the connecting piece TR, the upper half UH is machined flat in the region of the opening OP and provided with a layer LY of a more corrosion-resistant material.

Figure 5:
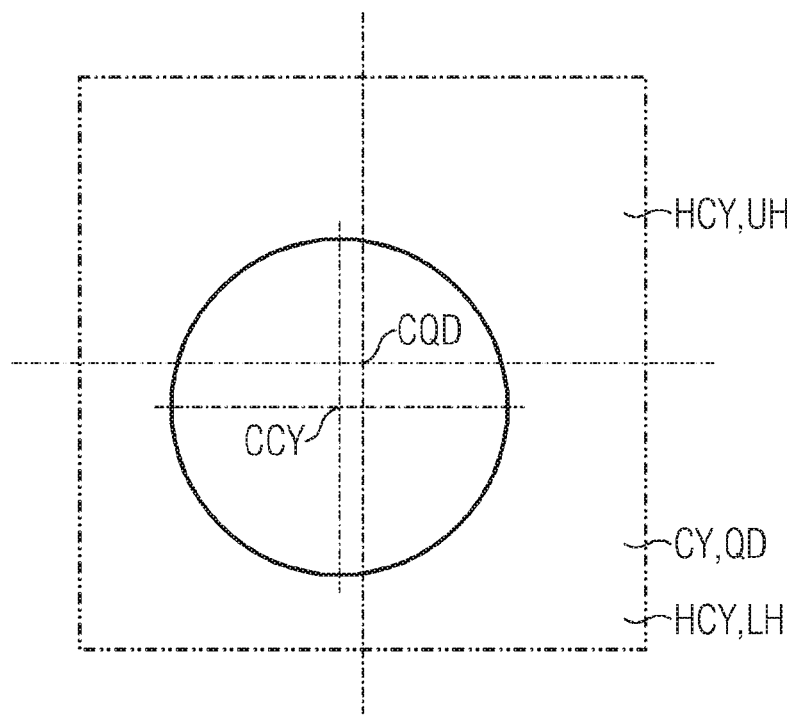
FIG. 5 a diagrammatic depiction of a variant of the hollow body configured with rectangular cross-section.

FIG. 5 shows the diagrammatic cross-section through a cuboid blank QD or a blank which has a rectangular cross-section. This corresponds to the hollow body CY already known from the other exemplary embodiments, wherein the cavity—here shown as round in cross-section—is arranged with its cross-section center CCY eccentric to the cross-section center CQD of the blank QD. The eccentricity refers to the parallel shift of the two axes of the cavity and the blank. The cross-section centers applied correspond substantially to the longitudinal extension of the two geometries, as can be seen from FIG. 7 with reference to axis X. The eccentric offset of the cavity in the blank QD allows production of inlet connecting piece IN and outlet connecting piece EX, as shown in FIGS. 6 and 7. In the region of the connecting pieces, the blank QD offers more material so as to provide sufficient flexibility in the design of the connecting pieces EX, IN. Before separation of the blank QD or the hollow body CY, the interior is coated with the more corrosion-resistant layer LY, as shown in FIG. 6. In some cases, also before separation, the inner surfaces of the connecting pieces IN, EX may be coated with the layer LY. The blank QD or the hollow body CY is separated in the separating joint plane SSP. Shoulders SH are machined into the blank QD so as to serve as counter-bearings for the fixing elements FE which fix the two half-shells HCY to each other in a manner not depicted in detail.

Figure 8:
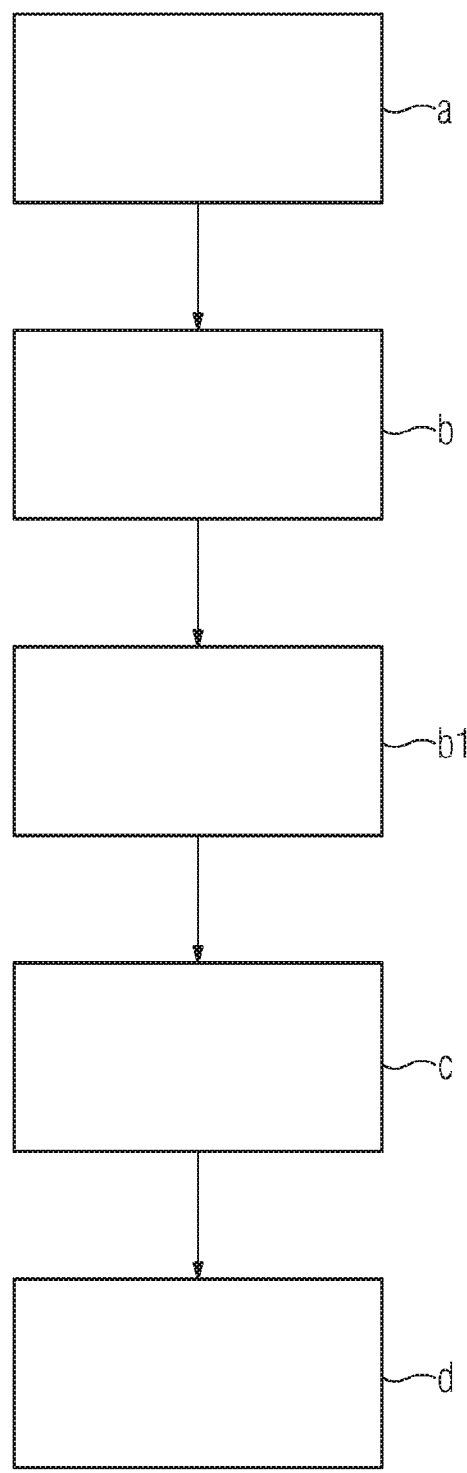
FIG. 8 a diagrammatic depiction of the process sequence.

FIG. 8 shows a flow diagram of a method which has the features according to the invention, for manufacturing a housing of the radial turbo compressor, with the following steps: a) providing a hollow body extending along an axis; b) deposition welding on the inside of the hollow cylinder (ZY) with a corrosion-resistant layer which is more corrosion-resistant than the material of the hollow cylinder; b1) stress-relief annealing of the hollow cylinder; c) separating the hollow cylinder into two half-cylinders along the axis; d)

assembling the housing by joining the two half-cylinders and fixing the two half-cylinders in the region of the separating joints which were created by separation, by means of releasable fixing elements.

The invention claimed is:

1. A method for manufacturing a housing of a turbomachine, in particular a housing of a radial turbo compressor, comprising the following steps:
    a) providing a hollow body which is closed in a peripheral direction and extends along an axis;
    b) coating an inside of the hollow body with a corrosion-resistant layer which is more corrosion-resistant than a material of the hollow body;
    c) separating, by means of a material-removing process, the hollow body into two half-shells along the axis in a separating joint plane;
    d) assembling the housing by joining the two half-shells and fixing the two half-shells in a region of separating joints which were created by the separation, by means of releasable fixing elements.

2. The method as claimed in claim 1,
wherein by means of mechanical machining, in particular material-removal machining, a flange in the region of the separating plane is prepared before and/or after separation, so as to prepare for the fixing of the two half-shells to each other by means of the fixing elements in step d).

3. The method as claimed in claim 1,
wherein the hollow body is configured as a hollow cylinder.

4. The method as claimed in claim 1,
wherein the hollow body is configured so as to be rotationally symmetrical.

5. The method as claimed in claim 1,
wherein the coating is applied by deposition welding.

6. The method as claimed in claim 5,
wherein the deposition welding is performed automatically.

7. The method as claimed in claim 5,
wherein the hollow body is subjected to stress-relief annealing after the deposition welding (step b) and before the separation (step c).

8. The method as claimed in claim 1,
wherein the material-removing process is performed by means of a saw cut, by means of erosion, by means of burning, by means of waterjet cutting, by means of laser beam cutting, or by means of electron beam cutting.

9. The method as claimed in claim 1,
wherein a volume lost by the separation of the hollow body in a region of the separating joint plane is compensated by corresponding surplus of the coating in the interior of the hollow body and subsequent mechanical machining of the diameter of the hollow body formed by the two half-shells after separation.

10. The method as claimed in claim 1,
wherein a volume lost by the separation of the hollow body in a region of the separating joint plane is compensated by means of deposition welding on at least one of two mutually opposing cut edges of the half-shells which form the separating joint.

11. The method as claimed in claim 1,
wherein after the separation of the hollow body, radial openings are provided in walls of the half-shells for connection of pipelines.

12. The method as claimed in claim 5,
wherein a stainless steel or a nickel-based alloy is used for the deposition welding.

* * * * *